United States Patent [19]

Bud

[11] 4,163,323

[45] Aug. 7, 1979

[54] LENGTH MEASURING DEVICES

[76] Inventor: Hans Bud, 71 Northway, London NW11 6PD, England

[21] Appl. No.: 789,252

[22] Filed: Apr. 20, 1977

[30] Foreign Application Priority Data

Apr. 22, 1976 [GB] United Kingdom ............... 16445/76

[51] Int. Cl.² ............................................... G01B 3/12
[52] U.S. Cl. .................................. 33/141 R; 33/141 E
[58] Field of Search ........................... 33/141 E, 141 R

[56] References Cited

U.S. PATENT DOCUMENTS

| | | | |
|---|---|---|---|
| 1,433,640 | 10/1922 | Morneau | 33/141 R |
| 2,467,515 | 4/1949 | Young | 33/141 R |
| 3,191,310 | 6/1965 | Carlson et al. | 33/141 E |
| 3,732,623 | 5/1973 | Bopst | 33/141 R |
| 3,791,038 | 2/1974 | Polydoris et al. | 33/141 R |

FOREIGN PATENT DOCUMENTS

| | | | |
|---|---|---|---|
| 37505 | 3/1955 | Poland | 33/141 E |
| 422611 | 1/1935 | United Kingdom | 33/141 E |

*Primary Examiner*—Steven L. Stephan
*Attorney, Agent, or Firm*—Browdy and Neimark

[57] ABSTRACT

A length measuring device comprising a housing, a measuring wheel rotatable by displacement of the device, a counter located in the housing and driven by the measuring wheel and sound generating means having two parts connected one to the housing and one to the measuring wheel, the two parts comprising respectively a contoured surface and an element biassed into contact with the surface for repeated deflection by and impact with the surface on rotation of the wheel to provide a continuous audible indication of the correct operation of the device.

11 Claims, 5 Drawing Figures

LENGTH MEASURING DEVICES

BACKGROUND OF THE INVENTION

This invention relates to length measuring devices of the kind having metering means such as a measuring wheel which may be rotated by displacement of the device relatively to an article to be measured and a counter comprising a plurality of coaxial number wheels for counting revolutions of the measuring means.

A manually operated device of this kind typically comprises a housing which rotatably supports a series of number wheels connected by a suitable gear train to a measuring wheel, a portion of which projects from the housing. To measure a length along a surface, the device is held either in the hand or at the end of a handle and is moved across the surface with the measuring wheel rotated by frictional contact with the surface.

If a sensible measurement is to be obtained it is of course imperative that there should be no slip between the periphery of the measuring wheel and the surface, and sufficient pressure must therefore be applied to the device in a direction normal to the surface to achieve the necessary frictional forces; this pressure will of course vary with the coefficient of friction of the surface to be measured. It has been a danger with previous devices that if insufficient pressure were applied during a measurement, the user would be unaware that slip had occurred and would in error accept the reading of the number wheels as correct; this danger is particularly acute where the device has functioned correctly over a major part of the surface so that the incorrect reading appears to the user as reasonable.

Attempts have been made to overcome this problem of slip by reducing to an absolute minimum the resistance to rotational movement of the measuring wheel so as to reduce the amount of pressure that has to be applied by the user. As a consequence, however, there is a danger that accidental contact with the measuring wheel either at the beginning or the end of a measurement will cause a spurious rotation of the wheel and so introduce an error into the reading. In addition there may be a tendency for the measuring wheel to continue to rotate under its own inertia for a short while after the device has been lifted from the surface, again introducing an error into the reading.

SUMMARY OF THE INVENTION

It is an object of this invention to overcome the above problems by providing a device which gives a substantially continuous indication of its correct operation so that the user is immediately aware if slip is occurring.

Accordingly, the present invention consists in a length measuring device comprising a housing; a counter located in the housing with a plurality of coaxial number wheels for displaying the result of a measurement; and drive means for the counter including metering means rotatable by displacement in use of the device relatively to an article to be measured; wherein there is provided sound generating means having a part formed on the drive means and a further part secured to the housing, the two parts comprising a ring of teeth and a reed biassed into contact with the teeth so as repeatedly to experience during rotation of the metering means deflection by the contoured surface followed by impact therewith under its bias the housing being internally shaped to provide a sound box for the sound generating means and, the repeated impacts of the reed with the teeth serving in normal usage of the device to provide a substantially continuous audible indication of rotation of the metering means.

It will be appreciated that since the user of the device according to the invention would be aware, as a result of irregularity or cessation of sound, if he were applying insufficient pressure for the correct operation of the device, resistance to rotation of the metering means need not be kept to an absolute minimum and may in fact be increased to an extent sufficient to prevent spurious rotation of the metering means.

A related problem with previous length measuring devices of this kind is particularly apparent when the measurement is to be taken from a point which is not easily accessible. A good example would be the measurement of the width of a room where the starting or finishing point is under a low slung article of furniture. Hitherto it has usually been necessary to position or lift the device with great care so as not to impact rearward rotation to the measuring wheel, as such rotation would of course subtract from the subsequent measurement.

To overcome this problem, an embodiment of the present invention may suitably be provided in which the reed co-operates with the ring of teeth in such a manner as to permit by ratchet action rotation of the metering means in one sense only.

BRIEF DESCRIPTION OF THE DRAWINGS

The invention will now be described by way of example with reference to the accompanying drawings in which.

DETAILED DESCRIPTION OF THE PREFERRED EMBODIMENTS

Figure 1:
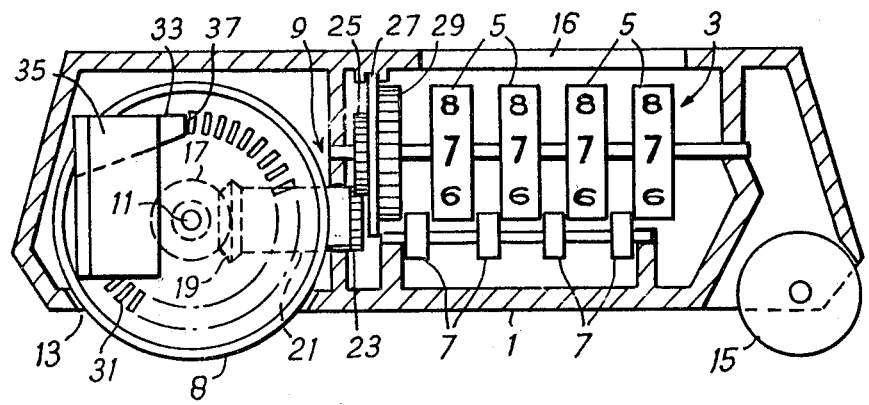
FIG. 1 is a sectional front elevation of a length measuring device according to the invention.
Figure 2:
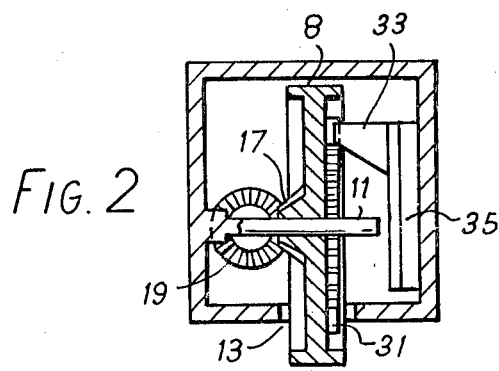
FIG. 2 is a section of FIG. 1.

The device shown in FIGS. 1 and 2 comprises a plastics housing 1 which is provided with various internal ribs and abutments for locating components of the device. A counter, shown generally at 3, comprises a series of number wheels 5 provided with transfer pinions 7 in the usual fashion. The drive mechanism for the counter comprises a measuring wheel 8 having a circumference of 10 cm (an imperial version of the device would typically have a measuring wheel circumference of 4 in.) and a gear train 9. The measuring wheel is rotatably mounted about an axis 11 near one end of the housing and an aperture 13 is provided in the housing to allow the measuring wheel to contact a surface on which the device rests; a freely rotatable roller 15 supports the other end of the device. A window 16 is provided in the upper surface of the housing to enable the user to read the position of the number wheels 5.

The measuring wheel 8 is provided with an integral and coaxial bevel gear 17 which co-operates with a bevel gear 19 formed at one end of a drive shaft 21.

The other end of shaft 21 is provided with a further gear 23 engaging with a larger gear 25 on wheel 27. A gear 29 on this wheel is engageable with a first one of the transfer pinions 7.

The measuring wheel 8 has, near the periphery of one of its circular faces, a ring of gear teeth 31 of approximately fifty in number which project from that face. A metallic reed 33 extends from an integral mounting plate 35 which is secured to the housing 1 of the device and at its free end the reed 31 is forced by its own resilience against the teeth 31. The reed and the mounting plate are formed from a single piece of metal sheet, with the dimensions of the mounting plate being significantly greater than those of the reed to facilitate mounting of the reed and to improve the sound generating capability.

In FIG. 1, if the device is displaced from left to right, the measuring wheel will rotate clockwise and the reed 33 will be regularly deflected by engagement with successive ones of teeth 31. The reed 33 will be returned after each deflection by the biassing effect of its own resilience and a series of audible clicks will be emitted upon repeated impact of the reed with the teeth 31, to assure the user that the measuring wheel is not slipping and that the device is functioning correctly. In view of the large number of teeth 31, the sound generated upon displacement at speeds to be expected in normal usage of the device will be substantially continuous, so that slippage of the measuring wheel of only short duration will still be detected by the user. In this embodiment, with fifty teeth on the measuring wheel, five clicks or audible signals will be generated per centimeter, which is the smallest complete unit displayed on the number wheels. In a preferred form, a device according to the invention will be adapted to generate at least two audible signals per complete unit of length displayed on the number wheels. When the user stops using the device, the braking effect of the reed will prevent the measuring wheel, and consequently the counter from over-shooting.

If the device is pushed from right to left, for instance to position the device against a wall or other datum point, the engagement of nose 37 of the reed with the teeth 31 will prevent rotation of measuring wheel 8. This ratchet action is important for the reasons discussed previously.

It will be appreciated that in this preferred embodiment of the present invention the reed 33 performs three functions, namely the emission of an audible indication of rotation of the measuring wheel; a braking effect to inhibit accidental rotation including over-shoot and a ratchet action to enable the device to be pushed or pulled backwards without affecting the accuracy of the indicated measurement.

Figure 3:
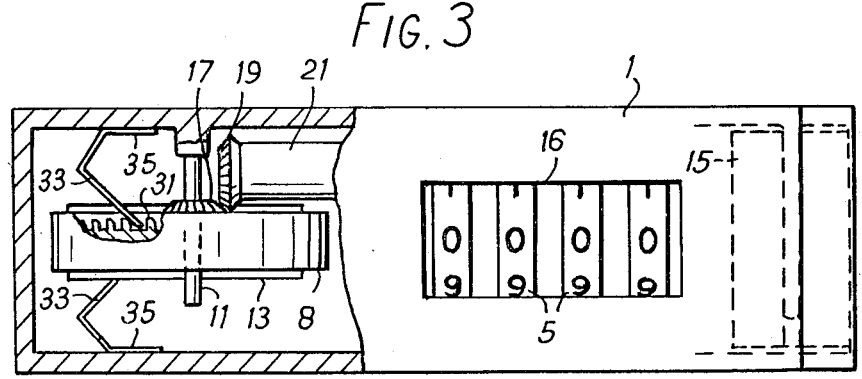
FIG. 3 is a part sectional plan view of the device similar to that shown in FIGS. 1 and 2 but illustrating a modification.

Referring now to FIG. 3, an additional reed 33 can be added if desired, and in other respects FIG. 3 is a plan view partly in section of FIG. 1. The two reeds shown in FIG. 3 are substantially identical and need not be further described. The two reeds 33 engage corresponding rings to teeth 31 formed on respective opposite faces of the measuring wheel 8, with the two rings of teeth being out of phase in such a manner that the impact of the respective reeds occurs alternately. In this way the frequency of impacts is effectively doubled and the substantially continuous generation of sound will remain even at lower speeds of displacement of the device.

Figure 4:
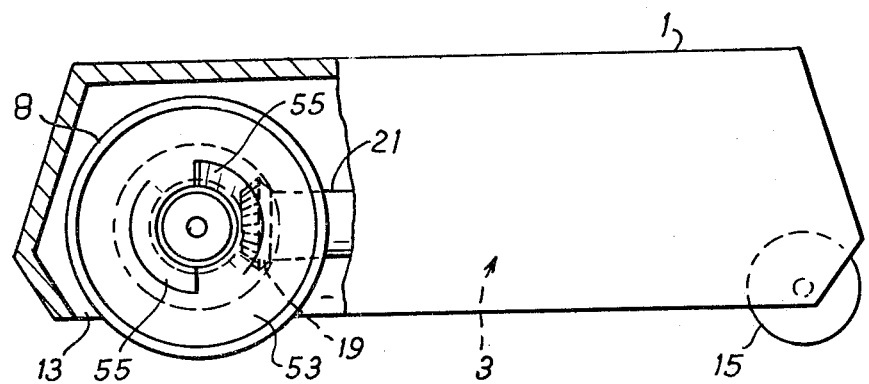
FIG. 4 is a view similar to FIG. 1 of a further embodiment of the invention.
Figure 5:
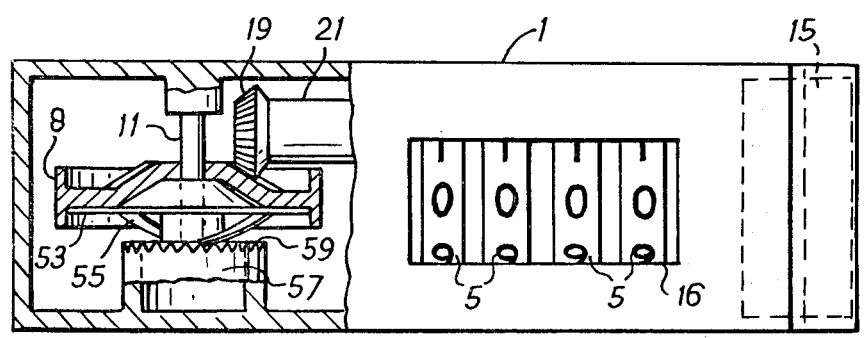
FIG. 5 is a part sectional plan view of FIG. 4.

A further embodiment of this invention is illustrated in FIGS. 4 and 5 which show a length measuring device having a plastics housing 1 and a counter 3 similar to those described above. The measuring wheel 8 is not, however, in this case planar as described in relation to FIGS. 1, 2 and 3 but is slightly domed. Teeth 51 are cut into the convex face of the measuring wheel to form a bevel gear co-operable with bevel gear 19 formed on the drive shaft 21. A metallic disc 53 is secured to the concave face of measuring wheel 8 and serves as a support plate for two arcuate reeds 55 which are pressed out of the disc. As shown in FIG. 5 a hollow boss 57 is integral with and projects inwardly from the housing 1 and is provided with a ring of teeth 59 disposed adjacent the free ends of the two reeds 55. These reeds 55 are biassed into contact with the teeth 59 through their own resilience. The operation of this embodiment of the invention is analogous with that of the embodiment described previously and as the device is displaced across an article to be measured the repeated impacts of the reeds 55 with the teeth 59 serve to provide a substantially continuous audible indication of correct operation of the device. The teeth and the reeds are preferably arranged so that the impacts of respective reeds are out of phase.

As is the case with the embodiment and modification shown in FIGS. 1, 2 and 3, the box-like shape of the housing in the region of the sound generating means formed by the ring of teeth and corresponding reeds serves to provide a sound box for that sound generating means.

This invention has been described by way of example only and length measuring devices according to the invention may differ from the described embodiments in many ways. The measuring wheel, for instance, may alternatively be disposed outside the housing or may be replaced by other forms of metering means such as a pair of measuring wheels or a roller. The two parts of the sound generating means which respectively comprise a contoured surface and an element biassed into contact with the contoured surface can as will be apparent from the described embodiments be provided on either one of the housing or the drive means for the counter. The ring of teeth could for example be provided on a member of the drive means other than the metering means and could indeed comprise the gear teeth of such a member. Where the ring of teeth is formed on the housing, it can either be formed on a member integral with the housing such as the described boss, or on a boss or other member secured to the housing.

The described embodiments, and particularly the counter in each case, have been illustrated somewhat diagrammatically since the exact design details of the counter mechanism are not part of this invention and numerous counters of well known design would be suitable. A particularly useful counter is described in co-pending application Ser. No. 578,342 and U.S. Pat. No. 3,977,599 to which reference is directed.

I claim:

1. A length measuring device comprising a housing; a counter located in the housing with a plurality of coaxial number wheels for displaying the result of a measurement; and drive means for the counter including metering means rotatable by displacement in use of the device relatively to an article to be measured; wherein there is provided sound generating means having a part formed on the drive means and a further part secured to the housing, the two parts comprising a ring of teeth and a reed biassed into contact with the teeth so as repeatedly to experience during rotation of the metering means deflection by the teeth followed by impact therewith, the housing being internally shaped to provide a sound box for the sound generating means and the repeated impacts of the reed with the teeth serving in normal usage of the device to provide a substantially continuous audible indication of rotation of the metering means.

2. A device as claimed in claim 1, wherein said ring of teeth is formed on the drive means.

3. A device as claimed in claim 2, wherein said sound generating means further comprises a second reed biassed into contact with a ring of teeth formed on the drive means so as repeatedly to experience during rotation of the metering means deflection by the ring of teeth followed by impact therewith as the reed returns under its bias.

4. A device as claimed in claim 1, wherein said part comprising a reed is formed on the drive means.

5. A device as claimed in claim 4, wherein said part formed on the drive means comprises a support plate rotatable with the drive means, said reed being integral with and extending from the support plate.

6. A device as claimed in claim 5, wherein said ring of teeth is formed integrally with a boss secured to or integral with the housing.

7. A device as claimed in claim 6, wherein said metering means comprises a measuring wheel mounted for rotation on the housing and wherein said support plate comprises a metallic disc secured for rotation with the measuring wheel.

8. A device according to claim 5, wherein there are provided two arcuate reeds pressed out of said support plate, each reed being engageable at its free end with the ring of teeth so that in use impacts of the respective reeds are out of phase.

9. A device according to claim 1, wherein the or each reed co-operates with the corresponding ring of teeth in such a manner as to permit by ratchet action rotation of the metering means in one sense only.

10. A length measuring device comprising a housing; a sound box formed within the housing and provided with an aperture; a measuring wheel mounted within the sound box for rotation relative to the housing and having a portion of the circumference thereof projecting through said aperture to enable the measuring wheel to be rotated by displacement of the device relative to an article to be measured; a counter located in the housing; means for transmitting rotation of the measuring wheel to said counter; and sound generating means having a part carried on the measuring wheel and a further part secured to the housing and within the sound box, the two parts comprising a ring of teeth and a resilient elongate member held at one end thereof and biassed into contact with the ring of teeth at its other end through its own resilience so as repeatedly to experience during rotation of the measuring wheel deflection by the teeth followed by impact therewith as the resilient elongate member returns under its bias, the repeated impacts serving in normal usage of the device to provide a substantially continuous audible indication of rotation of the measuring wheel.

11. A device according to claim 10 further comprising roller means mounted on the housing to support the housing on the article to be measured.

* * * * *